United States Patent [19]

Sublette et al.

[11] 4,309,574
[45] Jan. 5, 1982

[54] ELECTRONIC TONE RINGER

[75] Inventors: John D. Sublette, Huntsville, Ala.;
William Stobbs, North Reading, Mass.

[73] Assignee: GTE Automatic Electric Labs Inc., Northlake, Ill.

[21] Appl. No.: 140,525

[22] Filed: Apr. 15, 1980

[51] Int. Cl.³ ............................................. H04M 1/00
[52] U.S. Cl. ................................................ 179/84 T
[58] Field of Search .......................... 179/84 R, 84 T; 340/384 E

[56] References Cited

U.S. PATENT DOCUMENTS 3,965,307  6/1976  Dimmer ........................ 179/84 T
4,214,131  7/1980  Bush et al. ..................... 179/84 T

FOREIGN PATENT DOCUMENTS 1195360  6/1965  Fed. Rep. of Germany .... 179/84 T
2063624  8/1972  Fed. Rep. of Germany .... 179/84 T Primary Examiner—Bernard Konick
Assistant Examiner—J. A. Popek
Attorney, Agent, or Firm—Robert J. Black; Gregory G. Hendricks

[57] ABSTRACT

An electronic tone ringer for use in telephone substations. This circuit operates in response to conventional ringing signals and generates a single tone alert signal interrupted at a low frequency. The audible tone alert signal is generated by a piezo-ceramic transducer.

11 Claims, 1 Drawing Figure

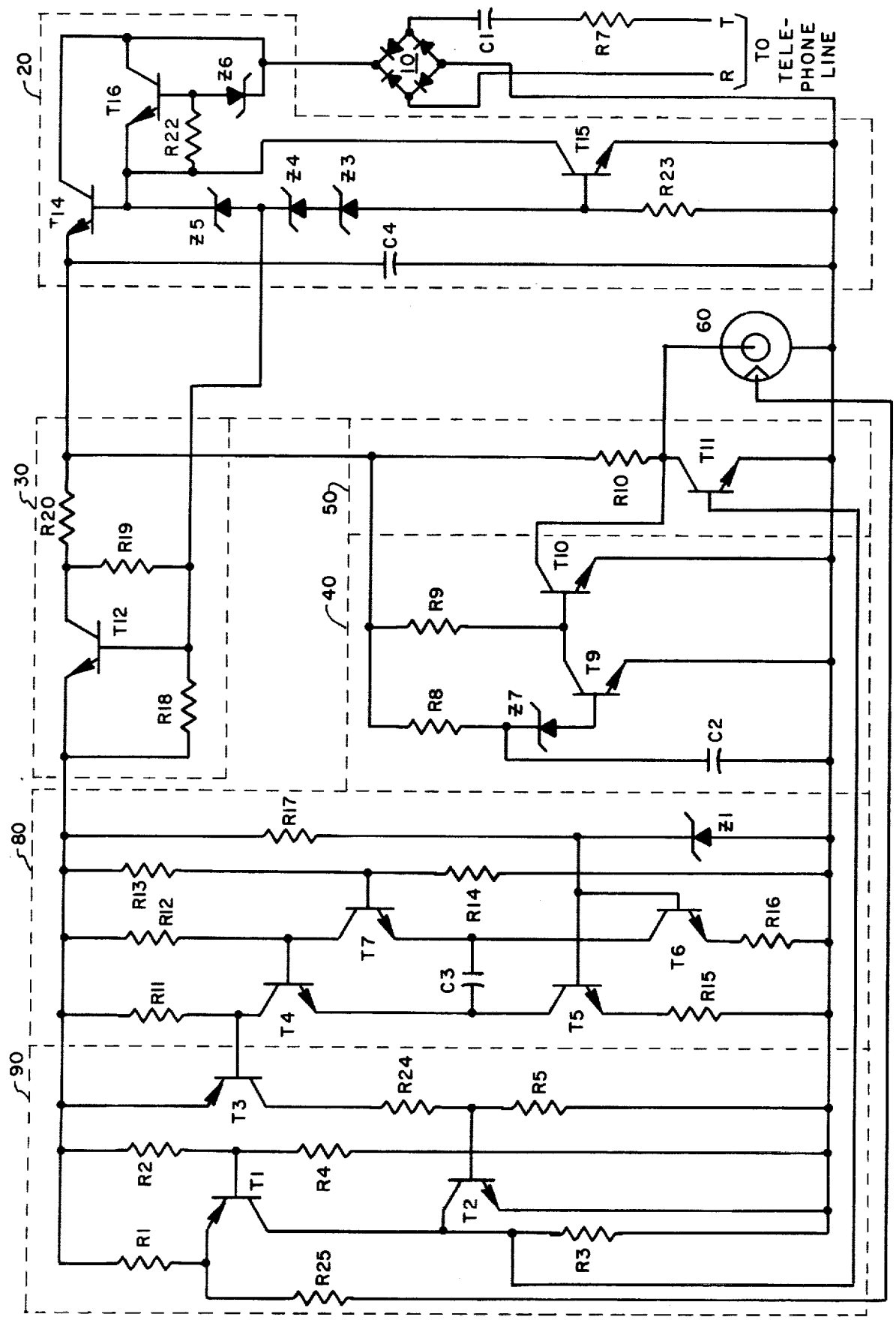

ELECTRONIC TONE RINGER

BACKGROUND OF THE INVENTION (1) Field of the Invention

The present invention relates to telephone systems and more particularly to a tone ringer for use in a telephone subscribers subset.

(2) Description of the Prior Art

Traditionally telephone subset ringers have been of the electromechanical type which includes an electromagnet operated in response to ringing signals, to cause a clapper or hammer type of mechanism to strike a bell or gong. Such electromechanical units are large in size and consequently difficult to include in present day telephone subsets. To overcome this problem electronic tone ringers have been developed.

Examples of the current state of the art of electronic tone ringers include U.S. Pat. No. 3,808,379 issued to P. U. Lind on Apr. 30, 1974 and U.S. Pat. No. 3,867,585 issued to R. A. Morstadt on Feb. 18, 1975. However, both of these circuits use a standard telephone receiver which is efficient as a tone ringer output device. Both of these circuits also use resistor-capacitor controlled oscillators to determine the frequency of the tone output. Thus the accuracy and consistency of frequency control depends on the accuracy of the resistor-capacitor time constant and the electrical properties of the semiconductor devices used in the oscillators.

Accordingly, it is the object of the present invention to provide an electronic tone ringer using a high efficiency transducer and consistent frequency control independent of the accuracy of a resistor-capacitor time constant and the electrical properties of semi-conductors. A further object is to provide reliable performance under low voltage conditions.

SUMMARY OF THE INVENTION

The present invention is an electronic tone ringer which utilizes a high efficiency transducer and provides frequency control independent of resistor-capacitor time constants and the electrical properties of semi-conductors.

This circuit consists of a first voltage regulator connected across a bridge rectifier which is connected to a telephone line. The first voltage regulator is connected to a ringer oscillator, a threshold and dial tap circuit and a second voltage regulator. A modulation oscillator is connected between a modulator and the second voltage regulator. A piezo-ceramic transducer is connected to the ringer oscillator and the modulator.

The bridge circuit operates to rectify an incoming ringing signal. The first voltage regulator operates to filter and regulate the rectified ringing signal and its output voltage is used to power the ringer oscillator and threshold and dial tap circuit. The second voltage regulator further regulates the output of the first voltage regulator and is used to power the modulation oscillator and the modulator.

Alerting signals are generated when the output of the ringer oscillator is applied to the piezo-ceramic transducer. A feedback path is connected from the transducer to the modulator which is connected to and controls the ringer oscillator thereby providing stable frequency control without dependency on the precision of the resistor-capacitor network or the thresholds of solid state components. The modulation oscillator operates at 10 Hz causing the modulator to switch at a 10 Hz rate. Thus the feedback signal is applied to the ringer oscillator at a 10 Hz rate, causing the transducer to generate a 10 Hz tone during each burst of incoming ringing signal. Low voltage performance is improved through use of the second voltage regulator which helps stabilize the modulation oscillator.

DESCRIPTION OF THE DRAWING

The single FIGURE of the accompanying drawing is a schematic diagram of an electronic tone ringer in accordance with the present invention.

DESCRIPTION OF THE PREFERRED EMBODIMENT

Referring now to the accompanying drawing, the electronic tone ringer of the present invention is shown.

Diode bridge 10 is shown connected to the telephone line via capacitor C1 and resistor R7. First voltage regulator 20 includes regulation pass transistor T14 whose collector is connected to diode bridge 10. A voltage protection shunt circuit comprising transistor T16 resistor R22 and zener diode Z6 protects the base collector junction of transistor T14. The base of transistor T14 is connected to a current protection shunt circuit which includes zener dodes Z5, Z4, and Z3, resistor R23 and transistor T15.

The emitter of transistor T14 is connected to second voltage regulator 30 comprising transistor T12 and resistors R18, R19 and R20. The emitter of transistor T14 is further connected to ringer oscillator 50 which comprises transistor T11 and resistor R10, and it is also connected to threshold and dial tap circuit 40 which includes the resistors R8 and R9, transistors T9 and T10, zener diode Z7 and capacitor C2. The collector of transistor T9 is connected to the base of transistor T10 whose collector is connected to the collector of transistor T11 which is connected across transducer 60. The emitter of transistor T14 is further connected to capacitor C4 which is connected to diode bridge 10.

The emitter of transistor T12 is connected to modulation oscillator 80, an astable multi-vibrator, comprising resistors R11-R17, transistors T4-T7, capacitor C3 and zener diode Z1.

The collector of transistor T4 is connected to modulator 90 via the base of transistor T3 whose collector is connected to the base of transistor T2. The emitter of transistor T1 is connected to piezo-ceramic transducer 60 via a feedback path including resistor R25. The collector of transistor T2 is connected to the collector of transistor T1 and also to the base of transistor T11 thus completing the feedback path from transducer 60 through resistor R25, and transistor T1 to transistor T11 and transducer 60.

Incoming ringing signals are detected and rectified by diode bridge 10 via capacitor C1 which blocks DC signals. This rectified ringing signal is then regulated and filtered in two stages. Regulator pass transistor T14 of voltage regulator 20 turns on if the amplitude of the ringing signal is sufficient to breakdown zener diode Z6, and the base emitter function of transistor T14. Under surge conditions current flow increases to a level sufficient to turn on voltage protection transistor T16, breakdown zener diodes Z5, Z4 and Z3 and the base emitter function of transistor T15, thereby shunting excess voltage and current surges from transistor T14 and preventing damage to the remaining circuitry. Under normal ringing conditions voltage regulator 20 acts as a voltage regulator for ringer oscillator 50, voltage regulator 30, and threshold and dial tap circuit 40. When the ringing voltage is not present, zener diodes Z6, Z5, Z4 and Z3 do not conduct, thereby presenting a high impedance to the telephone line. This ensures that the electronic tone ringer circuit does not cause any degradation in transmission characteristics of the telephone.

Voltage regulator 30 takes the output signal from transistor T14 and further regulates it to a lower more stable D.C. voltage using as a reference the breakdown voltage of zener diode Z5. The output voltage of transistor T12 is used to power modulation oscillator 80 and modulator 90.

Modulation oscillator 80 is an astable multivibrator whose frequency of oscillation is determined by the value of capacitor C3 and resistors R11, R12, R15 and R16. It generates a low frequency signal, typically 10 Hz, which is present at the collector of transistor T4. Biasing for this multivibrator is provided by resistors R13, R14 and R17, and zener diode Z1. Thus when sufficient voltage is developed across zener diode Z1, modulator 80 goes into oscillation.

Transistors T3 in modulator 90 responds to this 10 Hz signal by causing transistor T2 to switch at a 10 Hz rate. When transistor T2 is off the bias signal via transistor T1 is applied to the base of transistor T11 in ringer oscillator 50. When transistor T2 turns on it shunts the bias signal to the negative side of diode bridge 10 thereby turning transistor T11 off.

When transistor T10 turns off, transistor T11 operates under control of its base lead, and the regulated voltage from the emitter of transistor T14 via resistor R10 is applied to piezo-ceramic transducer 60 causing it to oscillate at its inherent frequency of approximately 2800 Hz.

Transducer 60 generates a feedback signal 180 degrees out of phase with its audible tone. This feedback signal is transferred to the base of transistor T11 via transistor T1 in modulator 90, if transistor T2 is turned off. Thus when transducer 60 generates a positive signal a negative feedback signal is applied to the base of transistor T11 which causes the bias signal from transistor T14 via resistor R10 to remain applied to transducer 60 thereby sustaining oscillation of transducer 60. Therefore transducer 60 generates a 2800 Hz audible tone 10 times per second for the duration of the incoming ringing signal.

During the initial application of the ringing signal, insufficient voltage exists to cause zener diode Z7, in threshold and dial tap circuit 40, to conduct. Consequently transistor T9 is turned off, allowing transistor T10 to turn on, thereby shunting T11 to the negative side of diode bridge 10. Therefore voltage is not applied across transducer 60 and it is prevented from generating an audible tone. When the ringing signal reaches sufficient voltage to cause zener diode Z7 to conduct, transistor T9 turns on causing transistor T10 to turn off. The voltage applied to the collector of transistor T11 via transistor T14 and resistor R10 then causes transistor T11 to oscillate in response to the feedback signal applied to its base by transistor T2.

Threshold and dial tap circuit 40 also operates to prevent dial tap when the dialing mechanism of the associated subscriber station is operated. Since dial pulses occur at a 10 Hz rate they can cause voltages to pass through diode bridge 10 and transistor T14. However, since these voltages are of insufficient magnitude to break down zener diode Z7, they are supressed and transistor T9 remains turned off causing transistor T10 to turn on thereby shunting bias voltage from transducer 60.

Upon detection of an incoming ringing signal, it is rectified by diode bridge 10 and regulated by regulators 20 and 30. This regulated voltage causes modulation oscillator 80 to generate a 10 Hz signal. It also causes threshold and dial tap circuit 40 to remove the shunt from ringer oscillator 50 thereby allowing this regulated voltage to be applied to transducer 60 which generates a 2800 Hz tone. By means of an out of phase feedback path from transducer 60, oscillation is sustained via modulator 90 which alternately shunts and applies the feedback signal to ringer oscillator 50 at the 10 Hz rate defined by modulation oscillator 80. Thus a 2800 Hz tone is generated 10 times per second during each burst of incoming ringing signal.

It will be obvious to those skilled in the art that numerous modifications of the present invention can be made without departing from the spirit of the invention which shall be limited only by the scope of the claims appended hereto.

What is claimed is:

1. An electronic tone ringer for use in a telephone subset connected to a telephone line comprising:
    voltage controls means connected to said telephone line, operated in response to ringing signals received over said telephone line, to generate a transducer bias signal;
    transducer means connected to said voltage control means operated in response to said bias signal to generate an audio signal and further operated to generate a feedback signal representative of said audio signal;
    a modulation oscillator connected to said voltage control means operated in response to said transducer bias signal to generate an oscillating control signal of a predetermined low frequency; and
    modulation means connected to said modulation oscillator and to said transducer means, operated to modulate said feedback signal with said oscillating control signal, whereby said feedback signal is periodically and alternately enabled and inhibited;
    said transducer means further operated in response to said periodically enabled feedback signal to periodically generate said audio signal.

2. An electronic tone generator as claimed in claim 1, wherein: said voltage control means includes rectifying means connected to said telephone line, operated in response to said ringing signals received over said telephone line, to convert said ringing signals to direct current potential.

3. An electronic tone ringer as claimed in claim 2, wherein: said modulation means comprise a switching transistor connected to said transducer, to said modulation oscillator, and to said rectifying means, said switching transistor operated in response to portions of said oscillating control signal of a first characteristic to shunt said feedback signal to said rectifying means, and further operated in response to portions of said oscillating control signal of a second characteristic to apply said feedback signal to said transducer.

4. An electronic tone ringer as claimed in claim 2, wherein: said voltage control means further comprise first voltage regulation means connected to said rectifying means, operated in response to said direct current potential to regulate the amplitude of said direct current potential to a first predetermined magnitude, and thereby generate said transducer bias signal.

5. An electronic tone oscillator as claimed in claim 4, wherein: said first voltage regulation means comprise a regulation pass transitor and voltage protection means, said voltage protection means connected between said regulation pass transistor and said rectifying means, operated to shunt said direct current potential of a predetermined magnitude away from said regulation pass transistor.

6. An electronic tone ringer as claimed in claim 5, wherein: said frist regulation means further comprise a capacitor connected between said regulation pass transistor and said rectifying means, operated to filter said direct current potential.

7. An electronic tone ringer as claimed in claim 5, wherein: said first voltage regulation means further comprise current protection means connected between said regulation pass transistor and said rectifying means, operated to shunt current of a predetermined magnitude away from said regulation pass transistor.

8. An electronic tone ringer as claimed in claim 7, wherein: said first voltage regulation means further comprise voltage reference means connected to said regulation pass transistor, operated to define a voltage having a magnitude equal to a predetermined portion of said direct current potential.

9. An electronic tone ringer as claimed in claim 8, wherein: said voltage control means further comprise second voltage regulation means connected to said first voltage regulation means operated in response to a predetermined portion of said bias signal to regulate the amplitude of said bias signal to a second predetermined magnitude;

said modulation oscillator operated in response to said regulated portion of said bias signal to generate said oscillating control signal.

10. An electronic tone ringer as claimed in claim 9, wherein: said second voltage regulation means is connected to said voltage reference means, operated in response to the voltage across said voltage reference means, to regulate said voltage across said voltage reference means.

11. An electronic tone ringer as claimed in claim 1, wherein: said modulation oscillator comprise an astable multivibrator.

* * * * *